Patented Apr. 7, 1931                                        1,800,114

UNITED STATES PATENT OFFICE

FREDERICK W. SULLIVAN, JR., AND ELMER W. ADAMS, OF WHITING, INDIANA, ASSIGNORS TO STANDARD OIL COMPANY, OF WHITING, INDIANA, A CORPORATION OF INDIANA

INSECTICIDE AND FUNGICIDE

No Drawing.        Application filed September 13, 1926.   Serial No. 135,290.

This invention relates to horticultural insecticides and fungicides, having the triple functions of a contact-poison, a stomach-poison for insects and a fungicide.

The composition of this invention is prepared in the form of a thick emulsion which may be diluted without separation and used as a spray for trees and plants. In its preferred form it contains a mineral oil, an oil-soluble copper compound and a stomach-poison, for example, of the arsenate type, together with water and suitable emulsifying agents.

The mineral oil may suitably be a more or less highly refined oil of viscosity between 50 and 200 sec. Saybolt at 100° F. For example, the so-called "white oils" of viscosity of 60 or 80 sec. Saybolt at 100° F. are suitable for this purpose. As the oil soluble copper compound, it is preferred to employ copper rosin soap, although other copper compounds may be used. For example, the copper compound corresponding to the preferentially oil soluble sulfonates of the alkali-metals derived from mineral oils in the manner described in Humphreys' Patent No. 1,286,179, granted November 26, 1918, or in other suitable manner, may be used. We may also employ copper sulfonates of the preferentially water-soluble sulfonic acids, derived from mineral oils in the manner described in Patent No. 1,474,933, granted November 20, 1923, to Humphreys and others, or in any other suitable manner. Copper salts of naphthenic acids, for example, the naphthenic acids derived from mineral oil, may also be employed. Such naphthenic acids may suitably be produced by treating lubricant distillate from coastal crudes which contain naphthenic acids, with alkali and extracting with alcohol. Other copper soaps, such as copper oleate, and the like, may be used, if desired. As a stomach-poison, lead arsenate is preferred, although any other suitable stomach-poison, such as Paris green, calcium or magnesium arsenates, sodium fluoride or the like may be employed. Various emulsifying agents may be employed; for example, glue, gelatine, albumen, caseinates, gums such as gum tragacanth, bentonite or other finely divided inorganic materials or other colloidal emulsifying agent may be employed. It is preferred to employ a mixture of a non-soap colloid, particularly glue, and mineral oil sulfonic soaps.

The composition is preferably in the form of a thick emulsion containing 1 to 10% of glue, 5 to 40% of water, 4 to 30% oil-soluble copper compound, 1 to 20% stomach-poison, 1 to 5% mineral oil sulfonic soaps and 5 to 70% mineral oil.

As a specific example the following is given:

| | Per cent |
|---|---|
| Liquid glue | 5 |
| Water | 33½ |
| Copper rosin soap | 8 |
| Lead arsenate | 9 |
| Sodium mineral oil sulfonate | 1½ |
| White oil, viscosity 60 sec. Saybolt at 100° F. | 43 |

Such a composition may be readily emulsified in the cold by slight agitation and may be diluted before use as a spray, or the like, for example, with between 10 and 100 volumes of water, without separation. It is preferred that the diluted emulsion should contain approximately 2% of mineral oil.

The mineral oil sulfonic soaps employed are preferably and preferentially oil-soluble soaps described in Humphreys' Patent No. 1,286,179.

We claim:

1. A composition capable of being dispersed in water to form a relatively stable horticultural insecticidal and fungicidal emulsion, comprising mineral oil, an arsenic compound, an oil-soluble copper rosin soap, a non-soap colloid and mineral oil sulfonic soap.

2. A concentrated emulsified composition capable of being dispersed in water to form a horticultural insecticidal and fungicidal emulsion of high stability, comprising white oil, lead arsenate, an oil-soluble copper rosin soap, glue, mineral oil sulfonic soap and water.

3. A composition capable of being dispersed in water to form a relatively stable horticultural insecticidal and fungicidal emulsion comprising 1 to 10% glue, 5 to 40% water, 4 to 30% oil-soluble copper compound, 1 to 20% stomach-poison, 1 to 5% mineral oil sulfonic soaps and 5 to 70% mineral oil.

4. A composition capable of being dispersed in water to form a relatively stable horticultural insecticidal and fungicidal emulsion, comprising about 5% liquid glue, 33½% water, 8% copper rosin soap, 9% lead arsenate, 1½% sodium mineral oil sulfonate and 43% white oil.

5. A composition capable of being dispersed in water to form a relatively stable horticultural insecticidal and fungicidal emulsion, comprising a mineral oil, an arsenic compound, an oil soluble copper compound, a non-soap colloid and mineral oil sulfonic soap.

FREDERICK W. SULLIVAN, Jr.
ELMER W. ADAMS.